March 1, 1966  R. A. BAKER ETAL  3,237,905
VERTICAL MOUNTING CLAMP FOR CARDBOARD TUBULAR CAPACITORS
Filed Nov. 12, 1963
2 Sheets-Sheet 1

INVENTORS
RONALD A. BAKER
BY PAUL H. FORSSANDER

ATTORNEY

March 1, 1966   R. A. BAKER ETAL   3,237,905
VERTICAL MOUNTING CLAMP FOR CARDBOARD TUBULAR CAPACITORS
Filed Nov. 12, 1963   2 Sheets-Sheet 2

INVENTORS
RONALD A. BAKER
PAUL H. FORSSANDER
BY
ATTORNEY

United States Patent Office 3,237,905
Patented Mar. 1, 1966

3,237,905
VERTICAL MOUNTING CLAMP FOR CARDBOARD TUBULAR CAPACITORS
Ronald A. Baker and Paul H. Forssander, Indianapolis, Ind., assignors to P. R. Mallory & Co., Inc., Indianapolis, Ind., a corporation of Delaware
Filed Nov. 12, 1963, Ser. No. 322,842
2 Claims. (Cl. 248—361)

This invention relates to arrangements for mounting electrical capacitors, and other component parts to electrical chassis.

An object of the invention is to improve the mounting means for electric capacitors, particularly cardboard type capacitors.

Other objects of the invention will be apparent from the following description and accompanying drawings taken with the appended claims.

The invention comprises the features of construction, combination of elements, arrangements of parts, and methods of operation referred to above or which will be brought out and exemplified in the disclosure hereinafter set forth, including the illustration in the drawings.

According to the present invention, improved mounting arrangements are provided for capacitors and like devices such as coil shields, tube shields, etc., and which are particularly suitable for the mounting of electrical capacitors.

In certain embodiments of the invention the mounting parts may also comprise one or more terminals of the capacitors.

The mounting means of this invention facilitates uniconstruction of the clamping device to afford rapid mounting of the clamp to a capacitor. The clamp is readily connected to a cooperating chassis or other panel member whereby the cost of manufacture and mounting is materially reduced. The mounting means can be grounded to the chassis or panel if desired or may be insulated therefrom in a simple and convenient manner.

While a preferred embodiment of the invention is described herein, it is contemplated that considerable variation may be made in the method of procedures and the constructing of parts without departing from the spirit of the invention. In the following description and in the claims, parts will be identified by specific names for convenience, but they are intended to be as generic in their application to similar parts as the art will permit.

Generally speaking, the invention comprises a clamp for vertically mounting an electrolytic paper type capacitor to a metal chassis. The clamp constitutes a flat metal strip or strap having its ends terminated in U-shaped members. One of said terminals is angulated with respect to the flat plane of the strap so that it will provide proper mating and interlock with the other end. Clenching means are struck out from the clamp in order to grip the paper container of the capacitor and to hold it tightly therewithin when the ends thereof are interlocked. Finger means of a resilient nature extend downwardly from the sides of the clamp. These fingers extend into apertures formed into the chassis so that the bowed ends of the fingers will be contained therein to rigidly hold the clamp on the chassis.

Figure 1:
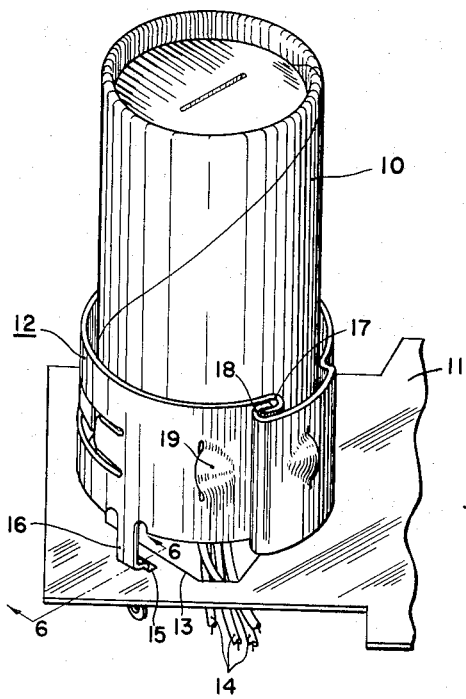
FIG. 1 is a perspective view showing the clamping means for the capacitor to the chassis arranged according to one aspect of the invention.

Referring to the drawings, FIGURE 1 shows a cardboard contained capacitor 10 surrounded and held securely to mounting base 11 by clamp 12. Aperture 13, located in base 11, serves as an opening for capacitor terminal 14. Apertures generally shown at 15 serve as mounting locations for the support prongs shown at 16.

Figure 2:
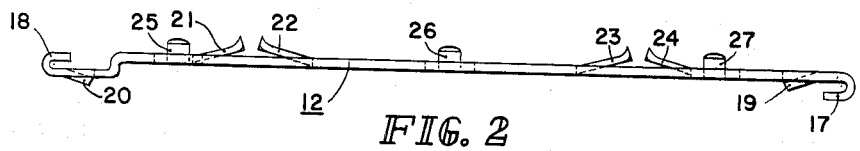
FIG. 2 is a top view depicting the clamping construction.
Figure 3:
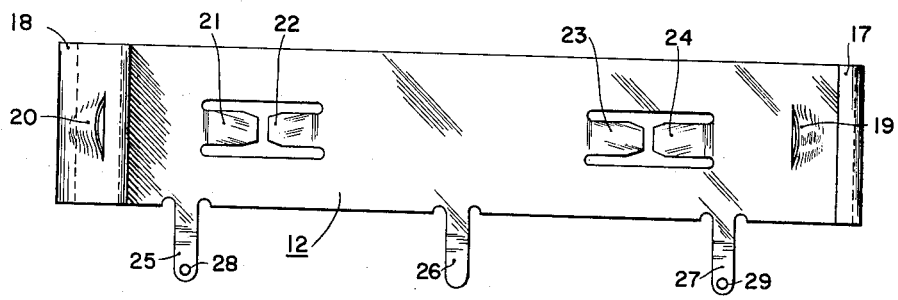
FIG. 3 is a front elevation showing clamping construction.

FIGURES 2 and 3 illustrate the construction of clamp 12. Located at opposing ends of clamp 12 are U-shaped ends or fingers 17 and 18. Protruding clench tongues 19 and 20, respectively, are located inwardly from fingers 17 and 18 and project vertically or radially from clamp 12. Tongues 19 and 20 extend away from the flat plane of the clamp. Securing lances 21–24, respectively, also extend away from the flat plane of the clamp but in the opposite direction to the aforesaid tongues. Support fingers 25, 26, and 27, projecting from end of clamp 12 in a downward direction and integrally connected thereto. On supports 25 and 27 are apertures 28 and 29 respectively, which serve as electrical terminating stations. Support members 25–26–27 are rounded on their lower end portions to assist their location on base 11.

Figure 4:
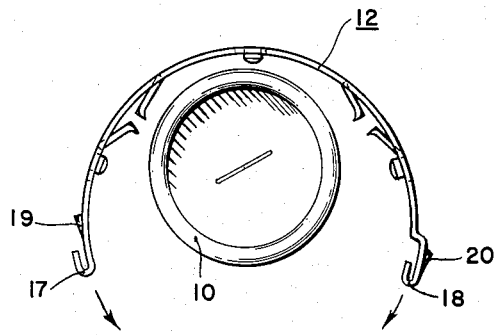
FIG. 4 is a top elevation illustrating the manner in which the clamp is placed around the capacitor.

Referring now to FIG. 4, it can readily be seen that by placing capacitor 10 beside clamp 12 and centrally locating it thereon, the opposing U-shaped fingers 17 and 18 can be radially swung into mating position with the help of pliers or tongs inserted into and/or against protruding clenching tongues 19 and 20. Because of their construction, when U-shaped fingers 17 and 18 are gathered together, finger 18 is forced to ramp up and out radially on finger 17. When pressure is placed on tongues 19 and 20, finger 18 passes over finger 17 and is then forced to interlock with finger 17. This effect is due to the spring tension being released on U-shaped finger 17 in an outward direction. Simultaneously with the clenching and lock-up operation, spring lances 21, 22, 23, 24, maintain the spring tension against the sides of cardboard capacitor 10 to grip the sides of the capacitor.

Figure 5:
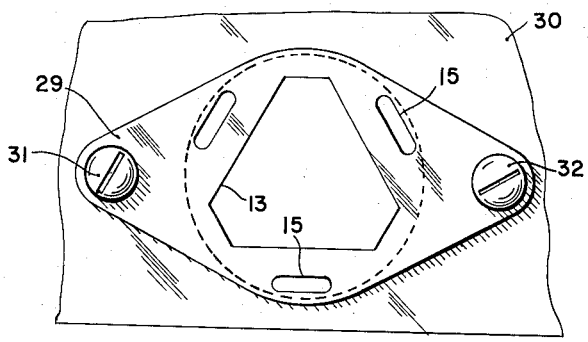
FIG. 5 is a top elevation illustrating a chassis mounting bracket punched to receive clamp and secured to the chassis body.
Figure 6:
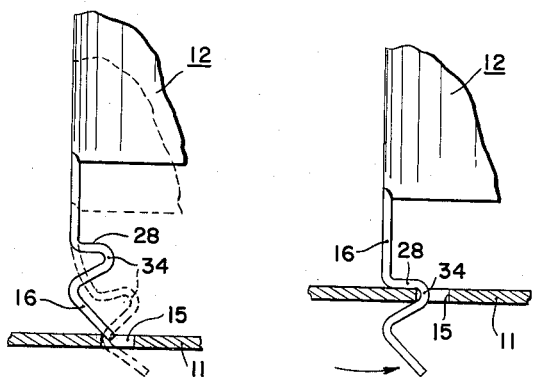
FIGS. 6 and 7 are a cross section taken through 6—6 in FIG. 1 in the direction of the arrows depicting locking means of the supports.
Figure 7:
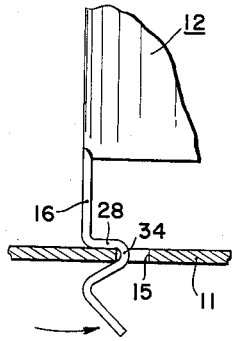

FIG. 5 illustrates a chassis mounting bracket 29 which has been punched to receive cardboard capacitor clamp 12. However, mounting bracket 29 may also be secured to chassis 30 by means of mounting screws 31 and 32 if desired. Referring now to FIG. 6 as taken through line 6—6 in FIG. 1, there is shown clamp 12 with support 16 sitting on chassis 11 prior to entering aperture 15. The dotted lines indicate the deformation of support 16 as it is inserted into aperture 15 in chassis 11. FIG. 7 shows clamp support 16 after it has been thoroughly depressed into position through aperture 15. Support 16 contains bowed portion 34. Depression of clamp 12 is completed when horizontal portion 28 located on support 16 comes in contact and/or bottoms against base 11. Clamp supports 16 may be released by applying force in the direction of the arrow against the lower portion of support 16, and at the same time pulling the clamp in an upward direction.

The container may be made of any material such as cardboard, metal, plastic, rubber, etc. By the present invention, a condenser mounting is provided which is universal in application, low in cost, and of uni-construction, which enables rapid assembly of the units to a chassis or other panels or boards; the capacitors may be grounded or insulated from ground as desired. The capacitor may be readily disassembled for replacing purposes; the mounting is mechanically strong and rigid to also provide a good electrical connection.

While the present invention, as to its objects and advantages, has been described herein as carried out in specific embodiments thereof, it is not desired to be limited thereby, but it is intended to cover the invention broadly within the spirit and scope of the appended claims.

What is claimed is:

1. A unitary clamp for mounting electrolytic cardboard type capacitor on an apertured chassis comprising: a substantially flat strip of resilient metal, said strip including U-shaped extremities; tongue means on said strip, said tongue means used to assist in interlocking said extremities each with the other to form a hollow cylindrical clamp for said capacitor; clenching means integral with said metal strip and extending into said formed clamp, said means gripping said capacitor; and a plurality of fingers extending from said resilient strip, said fingers having resilient bowed portions, said bowed portions of said fingers interfitting with said apertures of said chassis to thereby retain said clamp on said chassis.

2. A unitary clamp for mounting electrolytic cardboard type capacitor on a chassis comprising: a substantially flat strip of resilient metal, said strip including U-shaped extremities; tongue means on said strip, said tongue means used to assist in interlocking said extremities each with the other to form a hollow cylindrical clamp for said capacitor; clenching means integral with said metal strip and extending into said formed clamp, said means gripping said capacitor; and a plurality of fingers extending from said resilient strip, said fingers cooperating with said chassis to thereby retain said clamp on said chassis.

References Cited by the Examiner
UNITED STATES PATENTS

| 2,417,261 | 3/1947 | Morehouse | 248—74 |
| 2,423,627 | 7/1947 | Tinnerman | 248—74 |
| 2,876,276 | 3/1959 | Melton | 174—35.5 |

FOREIGN PATENTS

| 815,152 | 8/1951 | Germany. |
| 932,116 | 7/1963 | Great Britain. |

CLAUDE A. LE ROY, *Primary Examiner.*

J. F. FOSS, *Assistant Examiner.*